April 5, 1949.  E. V. SORENY  2,466,664
REFLEX CAMERA HAVING AUXILIARY FOLDING MIRROR
Filed Dec. 5, 1945  3 Sheets-Sheet 1

INVENTOR.
ERNEST V. SORENY
BY
ATTORNEY

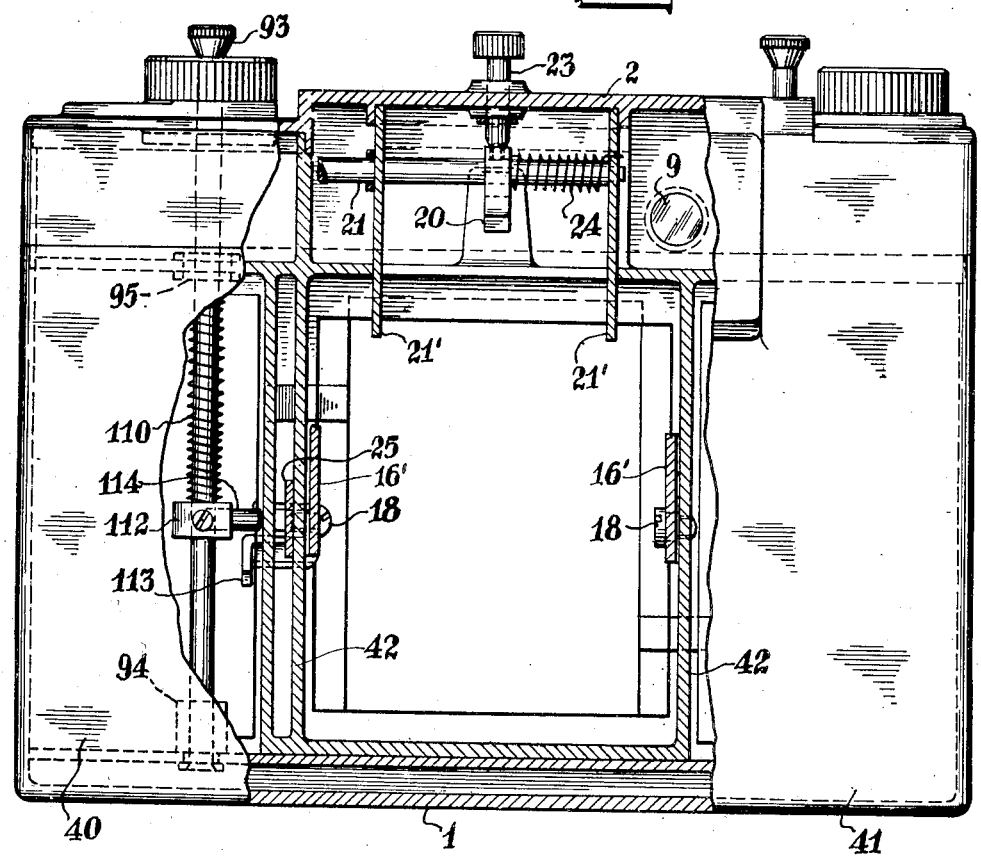
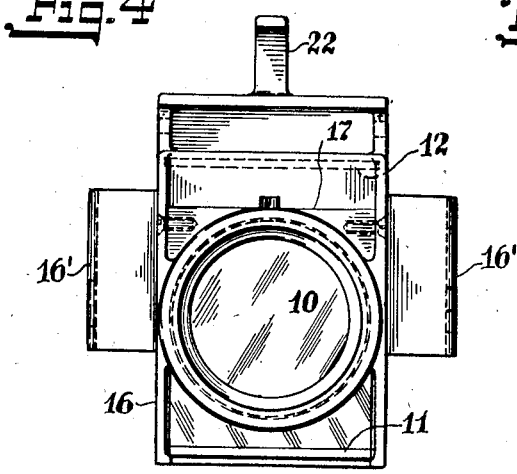
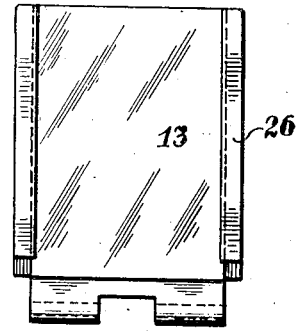

April 5, 1949.　　　　　E. V. SORENY　　　　　2,466,664
REFLEX CAMERA HAVING AUXILIARY FOLDING MIRROR
Filed Dec. 5, 1945　　　　　　　　　　　　　3 Sheets-Sheet 3
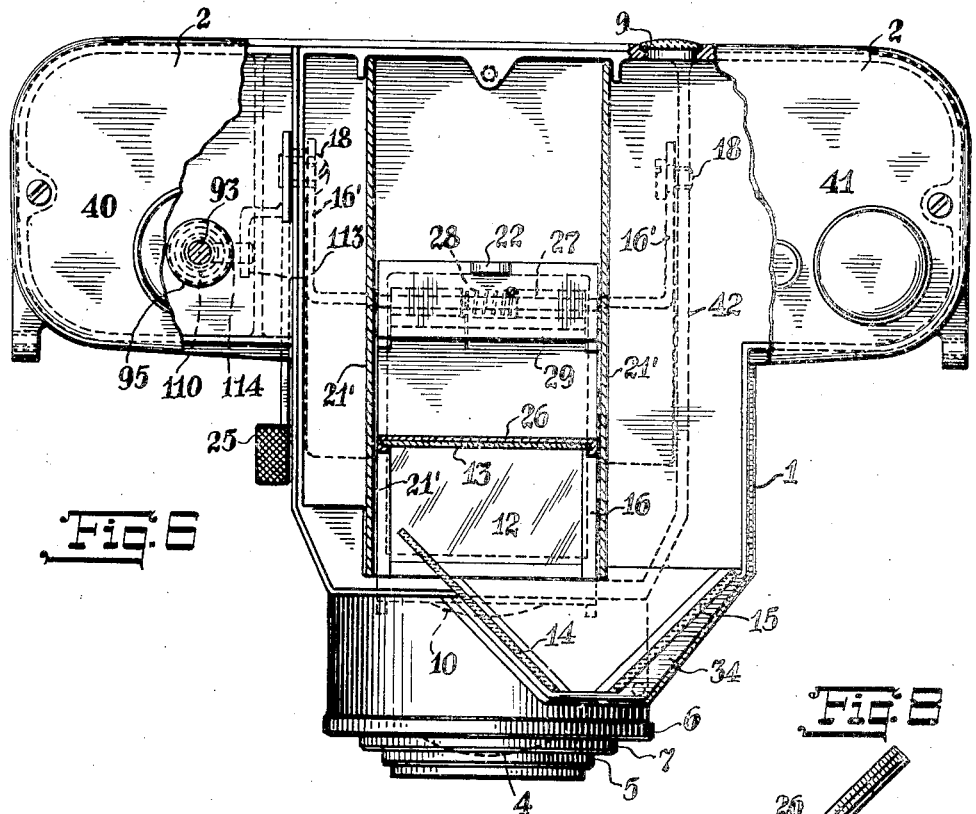
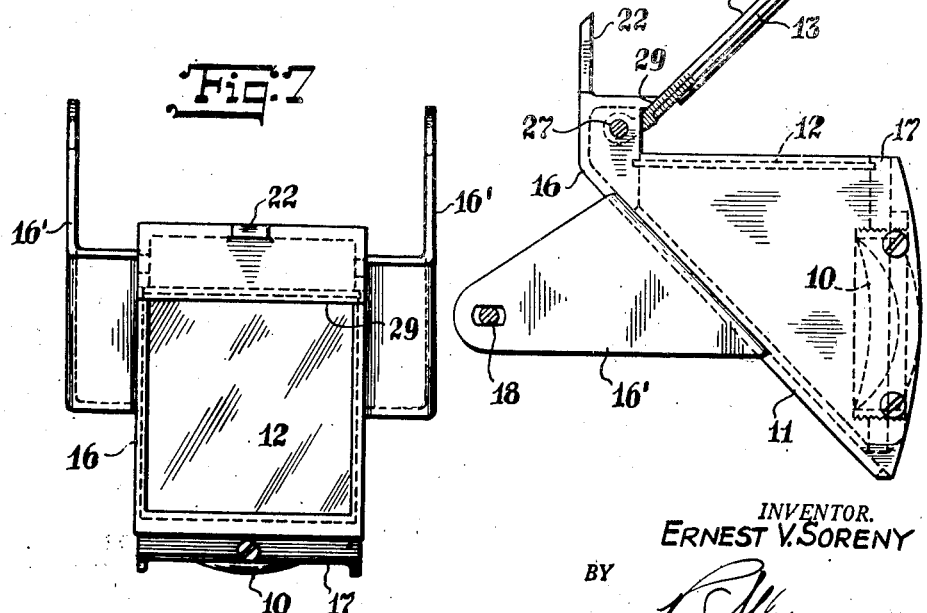
INVENTOR.
ERNEST V. SORENY
BY
ATTORNEY Patented Apr. 5, 1949

2,466,664

UNITED STATES PATENT OFFICE 2,466,664

REFLEX CAMERA HAVING AUXILIARY FOLDING MIRROR

Ernest V. Soreny, New York, N. Y., assignor to J. A. Maurer, Inc., Long Island City, N. Y., a corporation of New York Application December 5, 1945, Serial No. 632,880

3 Claims. (Cl. 95—42)

My invention relates to improvements in photographic cameras of the type disclosed in my application Serial Number 602,202, filed June 29, 1945, now Patent 2,442,327, issued May 25, 1948, to J. A. Maurer, Inc.

It is well known that in the ordinary camera the scene appears completely inverted, i. e. wrong side up and wrong side to on the usual ground glass and in the picture when taken. The reflex camera shows the scene right side up but wrong side to on the ground glass or focusing screen. According to my earlier application and in this improvement, I provide an optical viewing system by which the operator can look straight forward into and through the camera and see the entire scope of the picture to be taken exactly as seen by the naked eye right side up and right side to. He can at the same time focus the objective in the usual way and thereby provide a sharp real image on the ground glass and at the same instant take the picture.

This is accomplished by the use of an optical system empolying an auxiliary lens in back of the objective and an eye piece, a ground glass screen and four inverting mirrors arranged between the auxiliary lens and the eye piece. The auxiliary lens, the ground glass and one mirror at each side of it are mounted in a tray which is retractable when the picture is to be taken.

My present object is to perfect the previous invention, make the camera more compact for a given focal length of the objective and in combination provide means for retracting and resetting the tray with its attached parts.

Fig. 3 is a vertical sectional view taken looking from the front and showing parts of the tray apparatus.

Fig. 4 is a detail front view of the tray alone and without the second hinged mirror.

Fig. 5 is a plan view of the second mirror.

Fig. 6 is a plan and partial section showing parts of the tray and optical system.

Fig. 7 is a detail plan view of the tray showing the screen but without the second mirror.

Fig. 8 is a side view of the tray with the auxiliary lens, the first and second mirrors and the intervening screen.

Figure 1:
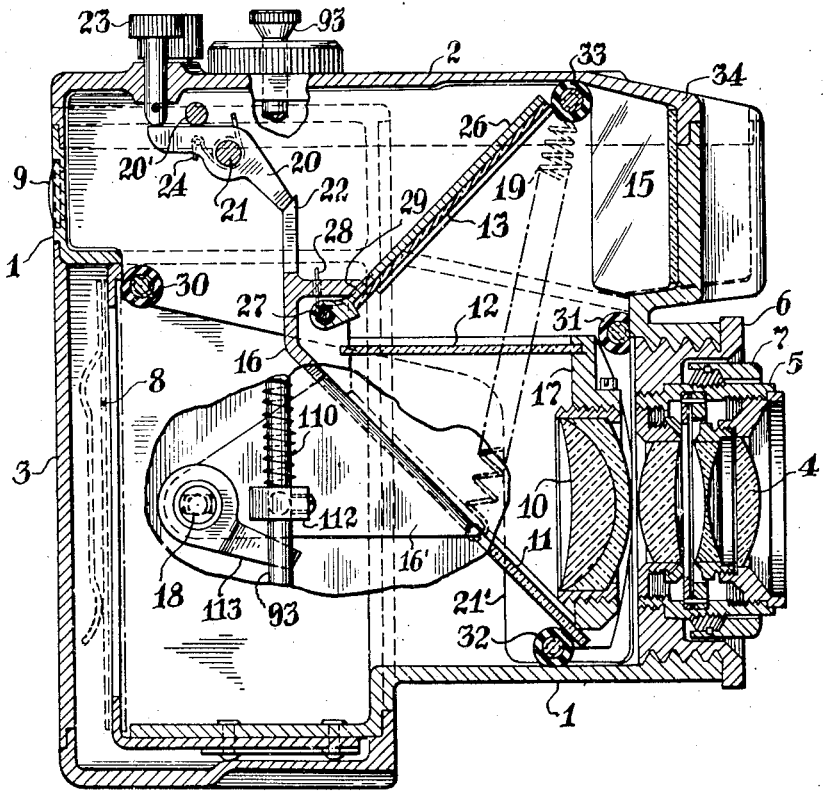
Fig. 1 is a longitudinal side and vertical sectional view showing the optical system including the tray with the auxiliary lens, mirrors and screen in the viewing position.

The casing or housing is made up of the main part 1, the removable top cover 2 and the removable back cover 3, all suitably secured together. The objective lens 4 may be of any suitable type mounted in a supporting member 5 and provided with a suitable adjusting member 6. Any suitable diaphragm with adjusting member 7 may be provided. The focal length of the lens of course will be adapted to the location of the film band 8 on which the picture is taken.

The objective lens is also a part of the optical system for viewing the scene through the eye piece or lens 9 and the auxiliary reducing lens 10. Between these two latter lenses are located the lower first mirror 11, the ground glass screen 12, the upper second mirror 13 and the two forward mirrors 14 and 15. When the objective lens is adjusted or focused the reduced but complete image is reflected upon the ground glass screen 12 and thence reflected by mirrors 13, 14 and 15 and observed through the eye piece 9 giving the very important natural appearance of the object to be taken. The screen 12 is referred to as "ground glass" but of course the specific material is unimportant so long as the usual function of ground glass in camera construction is attained.

A device which for convenience may be called an optical tray 16 carries the lower mirror 11, the mounting 17 for the lens 10, the ground glass screen 12 and the upper mirror 13. This tray is hinged at 18, 18 and is movable within the light chamber between opposite sides of the camera and held under tension of a spring 19 which tends to raise the tray and attached parts. In the position shown in Fig. 1 a pawl 20 pivoted on shaft 21 between the walls 21', 21' of the light chamber is interposed in the path of movement of the tray extension finger 22 to hold the tray in the viewing position. The release plunger or button 23 is slidable in the cover 2 and engages the end of the pawl 20 opposite the tray so that by depressing the plunger the pawl may be retracted to disengage it from the tray finger extension and permit the spring 19 to retract the tray and attached parts. A spring 24 serves to return the pawl and the plunger 23 when the plunger is released, the pawl stopping against cross bar 20'. A lever 25 connected to the arms 16' of the tray 16 outside of the light chamber containing the tray serves as a convenient means for resetting the tray with the auxiliary lens, the lower mirror, the screen and the upper mirror.

Figure 2:
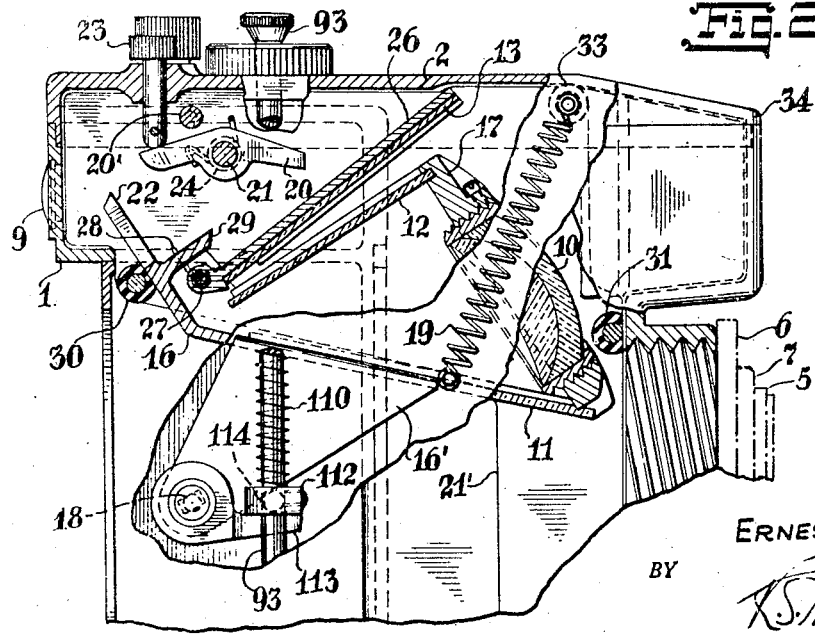
Fig. 2 is a similar view with the tray and the auxiliary lens, mirrors, and screen retracted in position to expose the film, the back cover of the casing being removed and the objective lens being omitted and part of the casing being broken away.

In my earlier case the upper mirror corresponding to mirror 13 is fixed in the casing whereas in this case the upper mirror 13 has a support or holder 26 hinged at 27 to the tray 16 and normally pressed by spring 28 against the shoulder 29 of the tray and moves to the position of Fig. 2 when the tray is released and retracted, the upper end of the mirror support 26 then abutting against the inside of the cover (Fig. 2). By this arrangement I am enabled to get much more room for adequate mechanism for carrying out the purpose of my invention. It will be understood from the foregoing that the tray and attached parts when retracted must not obstruct the objective lens action in taking the picture. I also prefer to provide resilient cushions 30 and 31 for the tray and for the auxiliary lens mount when the tray is tripped and a cushion 32 for the tray when it is reset and a cushion 33 for the upper end of the mirror support 26.

The front mirrors 14 and 15 will usually be fixed in an extension 34 of the casing, mirror 14 being alined with the upper mirror 13 and mirror 15 located to reflect from mirror 14 to the eye piece 9.

The light chamber in which the light rays travel is closed at the sides by baffle walls 21', 21' suitably constructed or lined with black felt or the like to permit movement of the tray without leakage of light.

The film winding mechanism and the shutter mechanism (not shown) are located in chambers 40 and 41 which are separated from the light chamber by walls 42, 42. A rod 93 which controls the release of the shutter mechanism (not shown) is mounted to be moved vertically in the bearings 94 and 95 but is not rotatable and is biased downwardly by spring 110 which presses against the sleeve 112 which is secured to the rod. The pin 114 on this sleeve is engaged by the arm 113 on the shaft 18 of the tray 16 when the tray is tripped or released by the depression of button or plunger 23 and retracted by the spring 19 in order to take a picture.

After the picture is taken the lever 25 is depressed and the tray and shutter release returned to the position of Fig. 1 ready to observe another object.

It will be understood that all joints between parts through which light could reach the film other than from the objective lens and the shutter must be properly sealed.

I claim:

1. In a camera, in combination with the objective lens, an optical viewing system including an auxiliary reducing lens, an eye piece and interposed mirrors for rectifying the image seen through the eye piece and the objective lens, a tray carrying said auxiliary lens and a pair of the mirrors and hinged to be retracted from the focal axis of the objective lens and means for folding one of the pair of mirrors with respect to the other mirror of said pair.

2. In a camera, in combination with the objective lens, an optical viewing system including an auxiliary reducing lens, an eye piece and interposed mirrors for rectifying the image seen through the eye piece and the objective lens, a tray carrying said auxiliary lens and a pair of the mirrors and hinged to be retracted from the focal axis of the objective lens, a screen carried by the tray between the mirrors of the pair and means for folding one of the pair of mirrors with respect to the other mirror of said pair.

3. In a camera, in combination with the objective lens, an optical viewing system including an auxiliary reducing lens, an eye piece and interposed mirrors for rectifying the image seen through the eye piece and the objective lens, a tray carrying said auxiliary lens and a pair of the mirrors and hinged to be retracted from the focal axis of the objective lens, means for folding one of the pair of mirrors with respect to the other mirror of said pair and means for sequentially retracting said tray and folding said folding mirror.

ERNEST V. SORENY.

REFERENCES CITED

The following references are of record in the file of this patent:

UNITED STATES PATENTS

| Number | Name | Date |
|---|---|---|
| 1,204,154 | Hora | Nov. 7, 1916 |
| 1,326,379 | Thompson | Dec. 30, 1919 |
| 1,831,794 | Adams | Nov. 10, 1931 |
| 2,043,902 | Mihalyi | June 9, 1936 |
| 2,364,652 | Pollock | Dec. 12, 1944 |
| 2,442,327 | Soreny | May 25, 1948 |

OTHER REFERENCES

Kuppenbender (APC publication), now abandoned; Serial No. 304,702, published May 4, 1943.